3,043,741
DRY PREPARATION CAPABLE OF YIELDING A CATION-ACTIVE MELAMINE RESIN SOLUTION BY DISSOLUTION IN WATER

Gustav Widmer, Basel, Switzerland, assignor to Ciba Limited, Basel, Switzerland
No Drawing. Filed Oct. 20, 1959, Ser. No. 847,449
Claims priority, application Switzerland Jan. 18, 1956
3 Claims. (Cl. 162—167)

This is a continuation in part of application Serial No. 633,521, filed January 11, 1957, now abandoned.

Aqueous solutions of cation-active melamine resins are being used to an increasing extent for the improvement of textiles and papers, and especially for the production of paper of improved wet strength. These solutions are usually prepared by dissolving a melamine resin in dilute hydrochloric acid and allowing the solution so obtained to ripen by standing for several hours or days at a moderately raised temperature. It is a great disadvantage to the finishing industries to have to handle concentrated hydrochloric acid, and the maintenance of the necessary conditions for ripening sometimes leads to manufacturing difficulties.

The present invention provides a dry preparation capable of yielding a cation-active melamine resin solution by dissolution in hot water, which preparation consists essentially of dry melamine hydrochloride and a dry condensation product of 1 mol of melamine with 3-6 mols of formaldehyde and in which preparation there are present per mol of melamine formaldehyde condensation product from 0.2 to 2 mols and preferably about 1 mol of melamine hydrochloride.

As formaldehyde condensation product of melamine there may be used for example trimethylolmelamine, tetramethylolmelamine and especially hexamethylolmelamine.

Dry melamine hydrochloride can be obtained in known manner, for example, by dissolving or suspending melamine in water and adding the necessary quantity of hydrochloric acid. If necessary, the mixture may be heated to bring about complete dissolution. After cooling the mixture, the precipitated hydrochloride is filtered off and dried. The formaldehyde condensation product of melamine can be prepared in known manner by cautiously drying, for example, by spray drying, an aqueous solution of the condensation product. If desired, the spray-dried condensation product or the melamine hydrochloride may be subjected to a further cautious after-drying treatment, for example, over a strong dehydrating agent, such as phosphorus pentoxide or concentrated sulfuric acid. By cautious drying it is possible to obtain dry preparations having a water content of at most 1 percent, which are surprisingly resistant to storage.

The dry mixtures prepared are soluble in water, and their solutions retain their usefulness even when artificially aged at 60° C. for many days, for example, for 200 hours, so that they possess the storage quality which is required at temperatures met with in practice.

When the dry preparation is dissolved in warm water and the solution is boiled, for example, with steam, the reaction to form the hardenable melamine resin and its ripening are completed during the boiling period. Thus, a solution of a cation-active melamine resin ready for use can be prepared by dissolving in hot water and/or boiling the dry mixture.

Modifying additions may, if desired, be incorporated with the dry preparation, such as cane sugar, methylcellulose, dextrin, sorbitol or an inorganic salt. Such additions may be added to the aqueous solutions which are to be dried to yield the dry preparations.

Aqueous ripened solutions prepared with the dry preparations of this invention can be used in the textile and paper industries with the same success as the aqueous solutions of cation-active melamine resins hitherto known. The dry preparations of this invention have the advantage for the finishing industries that they do not entail the risks of working with concentrated acid and that ripening affords no difficulty.

The following examples illustrate the invention, the parts being by weight:

EXAMPLE 1

324 grams (1 mol) of dry hexamethylol-melamine are milled with 162.5 grams (1 mol) of melamine hydrochloride in a dry state. 120 grams of the resulting dry preparation C are dissolved in 840 ml. of boiling water. The solution is allowed to stand for 5 minutes and then cooled down to 20° C. The initially white suspension begins to clarify in a few minutes and after about 5 minutes an opalescent solution of a colloidal cation-active melamine resin is obtained. The cooled solution is then made up with distilled water to 1000 ml. The resulting resin solution (A) has a resin content of 10.65% (calculated on the basis that dry preparation C contains 88.8% resin and 11.2% hydrochloric acid and water).

Resin solution (A) can be used for the production of paper of improved wet strength as follows:

A 1% suspension of bleached sulfite pulp refined to a Schopper Riegler freeness of about 44° (560 cc.) was adjusted with diluted hydrochloric acid to pH 4.5 and in four test series resin solution (A) is added to the suspension in such calculated amount that the proportion of dry resin is 4%, 2%, 1% and 0.5% by weight respectively calculated on the weight of dry sulfite pulp.

From the so obtained resin-containing sulfite pulp suspensions and from a control sulfite pulp to which no resin had been added, paper having a substance of 50 g. per square meter was formed in the usual manner on a paper-machine. The formed paper was dried once and then a second time for 2 minutes each at 120° C., and then conditioned for 18 hours at 20° C. and at a relative air humidity of 65%.

From the conditioned papers test-strips 15 x 140 mm. were cut. In order to determine their wet strength, the test-strips were immersed for 60 minutes in distilled water of 20° C. and containing 0.1% sodium diisobutylnaphthalene sulfonate as wetting agent, drained between two sheets of blotting paper and then immediately tested for wet tensile strength on the Amsler-Horizontal breaking machine, type 0.2 (breaking rate: 50 mm. per minute).

The results are given in the table below, the wet tensile strength of the test-strip being in wet breaking length, which is defined as the length of test-strip, the weight of which would be equal to the breaking weight.

Table I

| Resin solution used for paper impregnation | Percent dry resin calculated on dry paper | Wet breaking length in meters |
|---|---|---|
| Nil | 0 | 0 |
| Solution (A) | ½ | 642 |
|  | 1 | 945 |
|  | 2 | 1,122 |
|  | 4 | 1,240 |

EXAMPLE 2

Portions of 3.24 grams (0.01 mol) of hexamethylolmelamine (HMM), first finely ground in a ball mill, are well mixed in a mortar with increasing quantities varying between 0.081 gram and 16.25 grams (= 0.0005 and 0.1 mol) of melamine hydrochloride (M.HCl) prepared by dissolving melamine and hydrochloric acid in water of 90° C., cooling and drying the filtered crystals. 1 gram of this salt consumed 5.76 ml. n/1 NaOH, which corresponds to a content of 0.93 mol of HCl per mol of melamine.

2 grams of each resulting mixture of hexamethylolmelamine and melamine hydrochloride are stirred into 14 ml. of boiling water and the whole heated to the boil again. This is what is observed:

(a) With 0.05, 0.1 and 0.15 mol of melamine hydrochloride (M.HCl) per mol of hexamethylol melamine (HMM) a white hydrophobic resin is obtained which does not pass into solution.

(b) With 0.2 to 1.00 mol of M.HCl per mol of HMM the mixture dissolves within a few minutes to form a colloidal solution which, when kept in a water bath of 90° C., i.e. on further ripening forms a soft gel.

(c) When, after about 5-10 minutes the colloidal solutions obtained as described under (b) are diluted with cold water, colloidal solutions of the acid melamine formaldehyde resin are obtained which have a bluish opalescence and have a pot life of many days. They can be used in the manufacture of paper with improved wet strength. In proportions of more than 1 mol of hexamethylol melamine:1.0 mol of melamine hydrochloride coarser colloidal solutions are formed which are still liquid after 1 hour in the water bath at 90° C. but which on cooling form soft gels. The latter can be molten and diluted with water.

Experimental results are computed in detail in the Table below:

creases when increasing molar proportions of M.HCl are used.

What I claim is:

1. In the method for improving the wet strength of paper including forming a pulp slurry and sheeting said slurry to form said paper the improvement which consists in impregnating the pulp with a cation-active resin solution which has been obtained by dissolution in hot water of a dry preparation consisting essentially of dry melamine hydrochloride and a dry condensation product of 1 mol of melamine with 3-6 mols of formaldehyde, and in which preparation there are present per mol of melamine formaldehyde condensation product from 0.2 to 2 mols of melamine hydrochloride.

2. In the method for improving the wet strength of paper including forming a pulp slurry and sheeting said slurry to form said paper the improvement which consists in impregnating the pulp with a cation-active resin solution which has been obtained by dissolution in hot water of a dry preparation consisting essentially of dry melamine hydrochloride and dry hexamethylol melamine, and in which preparation there are present per mol of hexamethylol melamine from 0.2 to 2 mols of melamine hydrochloride.

3. In the method for improving the wet strength of paper including forming a pulp slurry and sheeting said slurry to form said paper the improvement which consists in impregnating the pulp with a cation-active resin solution which has been obtained by dissolution in hot water of a dry preparation consisting essentially of dry melamine hydrochloride and dry hexamethylol melamine and in which preparation there are present per mol of

*Table II*

| HMM:M.HCl, mols | M.HCl, g. | Behavior on dissolution in H₂O at 100° C. | Behavior on warming the solution in a water bath at 90° C. | Behavior 10 minutes after dilution of the solution with cold H₂O. |
|---|---|---|---|---|
| (a) 1:0.05 | 0.081 | White precipitate of resin, lumpy from the outset. | Sediment of white hydrophobic resin; supernatant water. | Cannot be diluted. White resin and water unchanged. |
| (b) 1:0.10 | 0.162 | | | |
| (c) 1:0.15 | 0.243 | | | |
| (d) 1:0.20 | 0.324 | Colloidal solution after 10'. | Clear gel after 1 hour. | Can be diluted. Gives blue, opalescent solution with a pot life of many days. Suitable for making paper with improved wet strength. Opalescent solution having a blue tinge: n and o, gel after 2 hours. p, pasty gel after 30'. |
| (e) 1:0.3 | 0.486 | | | |
| (f) 1:0.4 | 0.647 | | | |
| (g) 1:0.6 | 0.975 | | | |
| (h) 1:0.8 | 1.292 | | gelling begins after 2 hours. | |
| (i) 1:1.0 | 1.625 | | | |
| (k) 1:1.5 | 2.437 | | | |
| (l) 1:2 | 3.250 | Only weakly colloidal solutions. | All clear and liquid after 1 hour. On cooling, gels are obtained which can be molten and diluted with water. | |
| (m) 1:3 | 4.875 | | | |
| (n) 1:5 | 8.125 | | | |
| (o) 1:7.5 | 12.18 | | | |
| (p) 1:10 | 16.25 | | | |

The experiments show that colloidal solutions which have a blue opalescence and can be diluted with water, such as are useful for imparting improved wet strength to paper, can be prepared only when at least 0.2 mol of melamine hydrochloride is used per mol of hexamethylol melamine. For practical purposes, 2 mols of M.HCl per mol of HMM must be regarded as the upper limit.

When less than 0.2 mol of M.HCl is used per mol of HMM, lumpy white, hydrophobic resins are formed which cannot be diluted with water and which are unsuitable for treating paper pulp in a hollander.

When more than 2 mols of M.HCl are used, only slightly colloidal solutions are formed whose stability decreases when increasing molar proportions of M.HCl are used.

hexamethylol melamine about 1 mol of melamine hydrochloride.

References Cited in the file of this patent

UNITED STATES PATENTS

| 2,287,756 | Brookes | June 23, 1942 |
| 2,368,451 | D'Alelio | Jan. 30, 1945 |
| 2,918,453 | Widmer | Dec. 22, 1959 |

FOREIGN PATENTS

| 587,354 | Great Britain | Apr. 23, 1947 |